US010723060B2

(12) United States Patent
Reichler et al.

(10) Patent No.: US 10,723,060 B2
(45) Date of Patent: Jul. 28, 2020

(54) HVAC, PUMP, AND DEHUMIDIFIER COMBINED UTILITIES SKID SUPPORTING BLOW-MOLDING MACHINES

(71) Applicant: Graham Packaging Company, L.P., Lancaster, PA (US)

(72) Inventors: John R. Reichler, Lancaster, PA (US); Thomas Havekotte, York, PA (US)

(73) Assignee: Graham Packaging Company, L.P., Lancaster, PA (US)

( * ) Notice: Subject to any disclaimer, the term of this patent is extended or adjusted under 35 U.S.C. 154(b) by 300 days.

(21) Appl. No.: 15/937,946

(22) Filed: Mar. 28, 2018

(65) Prior Publication Data
US 2018/0281267 A1    Oct. 4, 2018

Related U.S. Application Data

(60) Provisional application No. 62/478,979, filed on Mar. 30, 2017.

(51) Int. Cl.
| | |
|---|---|
| *B29C 49/64* | (2006.01) |
| *B29C 49/28* | (2006.01) |
| *B29C 49/46* | (2006.01) |
| *F24F 1/04* | (2011.01) |
| *F24F 13/32* | (2006.01) |

(Continued)

(52) U.S. Cl.
CPC .............. *B29C 49/64* (2013.01); *B29C 49/28* (2013.01); *B29C 49/46* (2013.01); *F24F 1/022* (2013.01); *F24F 1/04* (2013.01); *F24F 3/1411* (2013.01); *F24F 13/02* (2013.01); *F24F 13/32* (2013.01); *B29C 2049/4602* (2013.01); *B29C 2049/4641* (2013.01); *B29C 2049/4673* (2013.01);

(Continued)

(58) Field of Classification Search
CPC .. F24F 1/04; F24F 13/32; B29C 49/64; B29C 49/28; B29C 2049/4673; B29C 2049/4641; B29C 2049/4602; B29C 49/46

See application file for complete search history.

(56) References Cited

U.S. PATENT DOCUMENTS

| | | | |
|---|---|---|---|
| 3,270,804 A * | 9/1966 | Paulus | F24F 1/02 165/48.1 |
| 6,279,333 B1 * | 8/2001 | Cilli | F24F 1/04 62/237 |
| 9,314,957 B2 | 4/2016 | Hirdina et al. | |

FOREIGN PATENT DOCUMENTS

DE        3938875 A1 *   5/1991   ............... F24F 1/04

* cited by examiner

*Primary Examiner* — Robert B Davis
(74) *Attorney, Agent, or Firm* — Stradley Ronon Stevens & Young, LLP

(57) ABSTRACT

A multi-functional utility skid for use with an air compressor, a chiller, and a connection having a first end engaging the chiller and a second end to provide utilities to a blow-molding machine for blow-molding articles. The skid is located proximate the machine and includes a pump engaging the second end of the connection, receiving chilled water from the chiller, being located proximate the chiller to minimize the length of the connection, and providing chilled water to both the machine and a separate supply of chilled water. The skid further includes an integral unit combining a dehumidifier that controls the humidity of the environment surrounding the machine with a heating, ventilation, and air conditioning unit that receives the supply of chilled water from the pump, controls the temperature of the environment surrounding the machine, and supplies conditioned air to the dehumidifier thereby avoiding the need for a heat exchanger.

20 Claims, 13 Drawing Sheets

(51) Int. Cl.
    *F24F 1/022*     (2019.01)
    *F24F 3/14*     (2006.01)
    *F24F 13/02*     (2006.01)
    *F24F 110/10*     (2018.01)
    *F24F 110/20*     (2018.01)

(52) U.S. Cl.
    CPC ... *F24F 2003/1458* (2013.01); *F24F 2110/10* (2018.01); *F24F 2110/20* (2018.01)

| EVAPORATOR | | | | | | | | | | CONDENSER | | | ACOUSTIC 100% LOAD | | | | | | | | |
|---|---|---|---|---|---|---|---|---|---|---|---|---|---|---|---|---|---|---|---|---|---|
| EWT (°F) | LWT (°F) | FLOW RATE (gpm) | PRESSURE DROP | FOULING FACTOR | MIN FLOW (gpm) | MAX FLOW (gpm) | WATER VOLUME | PIPE CONN. SIZE | | ENTERING AIR | ALTITUDE | AIRFLOW VOLUME | MAX SOUND POWER LWA per ARI 370 | 63 Hz | 125 Hz | 250 Hz | 500 Hz | 1K Hz | 2K Hz | 4K Hz | 8K Hz |
| 46.3 | 40.1 | 343.1 | 19.1 | 0.0001 | 100 | 385 | 8.8 | 0 | | 95 | 1000 | 88993 | 95 | 98 | 97 | 93 | 93 | 89 | 86 | 82 | 79 |
FIG. 6
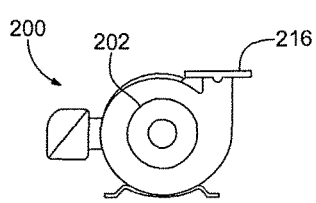
FIG. 7A
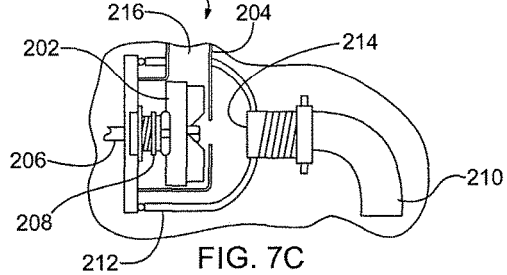
FIG. 7C
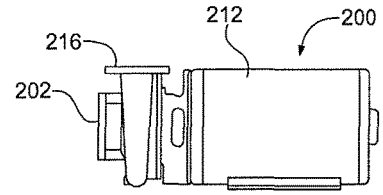
FIG. 7B

HVAC, PUMP, AND DEHUMIDIFIER COMBINED UTILITIES SKID SUPPORTING BLOW-MOLDING MACHINES

RELATED APPLICATION

This application claims the benefit of priority to U.S. Provisional Patent Application Ser. No. 62/478,979, filed on Mar. 30, 2017, the contents of which are incorporated in this application by reference.

FIELD OF THE INVENTION

The present invention relates generally to machines for manufacturing hollow articles from thermoplastic materials by blow molding and, more particularly, to the components required to provide utilities to the blow-molding machines.

BACKGROUND OF THE INVENTION

Blow molding is a fabrication method for hollow thermoplastic shapes. There are two general classes of plastic products made using the blow-molding process and related machinery: packaging products and technical parts. Packaging products include such items as bottles, jars, jugs, cans, and other containers. Technical parts include automotive components such as bumpers, fuel tanks, functional fluid containers, ducting, and the like. The term "articles" is used to encompass either or both packaging products and technical parts.

The blow-molding process can be of two general types: extrusion blow molding and injection blow molding. In extrusion blow molding, a thermoplastic parison is lowered from an extruder and between mold halves. The mold halves close around the parison, and the parison is then expanded against a mold cavity by introduction of a blowing gas, usually air. In injection molding, a thermoplastic material is first injection molded into a preform parison which is then transferred to a blow mold and expanded in the same manner as in an extrusion blow-molding process.

In intermittent extrusion, the molds are mounted to a common platen and the parisons are extruded by either a reciprocating screw extruder or by a ram accumulator which holds in readiness a volume of molten plastic material needed to make the next article or articles. In continuous extrusion, a molten parison is produced from an extruder die without interruption, and a segment of the parison is severed and positioned into a mold. The molds can be moved from station to station on rotating vertical wheels, on a rotating horizontal table, or with a reciprocating action. When the parison is extruded, the mold is moved under the extruder die or flow head to receive the parison segment and then is moved to a blowing station.

The positioning of the parison relative to the mold in a rotary system is relatively difficult. Therefore, many of the current blow-molding machines use the reciprocating mold concept according to which the molds are shuttled back and forth from station to station. A major drawback of the reciprocating mold concept, however, is a limitation on production rate.

A. Horizontal Rotary Blow-Molding Machines

Horizontal rotary blow-molding machines allow for high production rates of uniform articles. Such machines index circumferentially spaced mold halves in steps around a vertical axis. The mold halves each capture a vertical, continuously growing parison at an extrusion station. In one machine, the flow head extruding the parison moves up away from the mold halves after the mold halves close to capture the parison. The parison is severed adjacent the top of the mold halves, the mold halves are moved away from the extrusion station, and a top blow pin is moved into the end of the captured parison at the top of the mold halves to seal the mold cavity and blow the parison. Subsequently, the flow head and dependent parison are lowered back to the initial position so that the new parison is in position to be captured by the next pair of mold halves. The blown parison cools as the mold halves are rotated around the machine, following which the mold halves open at an ejection station and the finished article is ejected from between the mold halves. The machine includes an in-mold labeling station between the ejection station and the extrusion station for applying labels to the interior surfaces of the mold cavities.

In another horizontal rotary blow-molding machine the parison grows down over a blow pin at the bottom of the mold halves before closing of the mold halves. The flow head is moved up above the closed mold before severing of the new parison from the captured parison. The mold is then indexed laterally to the next station without dropping and the captured parison is blown within the cavity. In a further horizontal rotary blow-molding machine, the whole turntable supporting all of the mold halves is raised and lowered during rotation as each mold captures a parison at the extrusion station.

B. Utilities

Utilities such as chilled water, HVAC (heating, ventilation, and air conditioning), dehumidified air, and compressed air must be provided to the blow-molding machines. The chilled water is used to cool the molds. The chiller used to generate the chilled water must be located remote from the blow-molding machines given its heat load. The HVAC and dehumidified air are used to condition the space in which the blow-molding machines operate. More specifically, the dehumidified air conditions the environment of the blow-molding machine to prevent condensation on the molds (which, among other problems, can cause corrosion of the molds). A heat exchanger is provided to reduce the temperature of the air provided to the dehumidifier from ambient (about 20° C.) to about 10° C. An air compressor system provides compressed air needed to operate the machines.

Conventionally, the chiller, its related pump, the HVAC unit, the dehumidifier, its related heat exchanger, and the air compressor are all independent and isolated units. These six independent units require both substantial space (i.e., they create a large footprint) and mechanical connections (e.g., pipes, hoses, and the like). The time and cost involved with installing these individual components is substantial. In addition, the related cost of the components themselves, including the cost of connections to and from the components, is high.

To overcome the shortcomings of conventional systems that provide utilities to blow-molding machines for blow-molding articles, a new system having a multi-functional utility skid is provided for use with an air compressor and a chiller. In view of the relatively large commercial demand for various types of plastic articles, it would be desirable to reduce the cost of supplying utilities to blow-molding machines. The present invention satisfies this desire.

An object of the present invention is to reduce capital costs and installation costs. Related objects are to eliminate redundant components (such as a heat exchanger) and reduce the number and length of connections between, and the installation time of, the various components that comprise the system. Another object is to combine three components into one, reducing the footprint of the system and permitting the components to be located proximate (i.e., adjacent to) the blow-molding machine with minimal connections.

SUMMARY OF THE INVENTION

To achieve these and other objects, to meet these and other needs and desires, and in view of its purposes, the present invention provides several embodiments of a system for blow-molding articles from a parison. In one embodiment, the system includes a blow-molding machine having molds and a surrounding environment; an air compressor located proximate the blow-molding machine and configured to supply compressed air to the blow-molding machine; a chiller located remotely from the blow-molding machine and configured to provide chilled water; a connection having a first end engaging the chiller and a second end; and a multi-functional utility skid located proximate the blow-molding machine. The multi-functional utility skid includes a pump configured to engage the second end of the connection and receive chilled water from the chiller, the pump located proximate the chiller to minimize the length of the connection and further configured to provide chilled water to the blow-molding machine and to a separate supply of chilled water. The multi-functional utility skid further includes an integral unit combining a dehumidifier with a heating, ventilation, and air conditioning unit, the heating, ventilation, and air conditioning unit configured to (i) engage the pump via a direct connection, (ii) receive the supply of chilled water from the pump, (iii) control the temperature of the environment surrounding the blow-molding machine via a first air stream, and (iv) supply a conditioned air stream and an unconditioned air stream to the dehumidifier without a heat exchanger, the dehumidifier and the heating, ventilation, and air conditioning unit being separated by an adjoining interface having two ports through which respectively pass the conditioned air stream and the unconditioned air stream from the heating, ventilation, and air conditioning unit to the dehumidifier.

In another embodiment, a multi-functional utility skid is provided for use with an air compressor, a chiller, and a connection having a first end engaging the chiller and a second end to provide utilities to a blow-molding machine for blow-molding articles in an environment. The skid is located proximate the blow-molding machine and includes a pump configured to engage the second end of the connection and receive chilled water from the chiller, the pump located proximate the chiller to minimize the length of the connection and provide chilled water to the blow-molding machine and to a separate supply of chilled water. The skid further includes an integral unit combining a dehumidifier with a heating, ventilation, and air conditioning unit, the heating, ventilation, and air conditioning unit configured to (i) engage the pump via a direct connection, (ii) receive the supply of chilled water from the pump, (iii) control the temperature of the environment surrounding the blow-molding machine via a first air stream, and (iv) supply a conditioned air stream and an unconditioned air stream to the dehumidifier without a heat exchanger, the dehumidifier and the heating, ventilation, and air conditioning unit being separated by an adjoining interface having two ports through which respectively pass the conditioned air stream and the unconditioned air stream from the heating, ventilation, and air conditioning unit to the dehumidifier.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying figures. It is emphasized that, according to common practice, the various features of the figures are not to scale. On the contrary, the dimensions of the various features are arbitrarily expanded or reduced for clarity. Included in the drawing are the following figures:

FIG. 6 is a table summarizing design parameters for the air-cooled chiller shown in FIGS. 5A, 5B, 5C, 5D, and 5E;

FIG. 7A is an end view of an exemplary pump suitable for use in the system shown in FIG. 2;

FIG. 7B is a side view of the pump shown in FIG. 7A;

FIG. 7C is a sectional side view of the pump shown in FIGS. 7A and 7B;

DETAILED DESCRIPTION OF THE EMBODIMENTS

Figure 1:
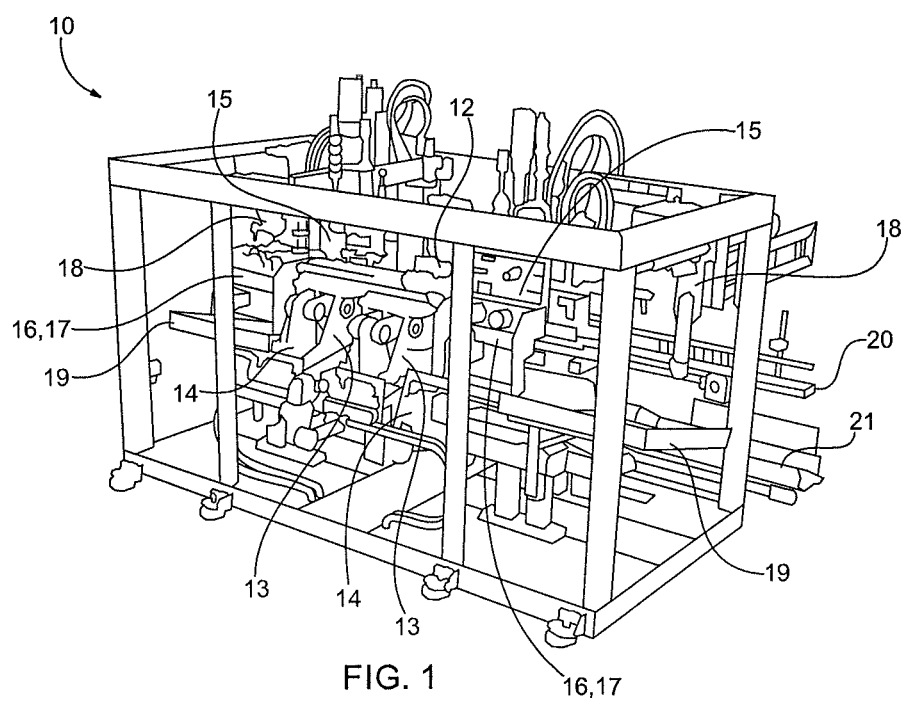
FIG. 1 is a schematic perspective view of several of the basic components of an exemplary blow-molding machine according to the present invention.

Described below is an improved system 1 that combines two main components: a blow-molding machine 10 and a multi-functional utility skid 100. These two main components also interact with two other components, an air compressor 30 and an air-cooled water chiller 80, to create a system 1 able to blow-mold articles.

A. Blow-Molding Machine

Referring now to the drawing, in which like reference numbers refer to like elements throughout the various figures that comprise the drawing, FIG. 1 shows a schematic perspective view of several of the basic components of an exemplary blow-molding machine 10. The blow-molding machine 10 has a plurality of metal cutting blades 12 to separate the parison flowing out of the flow head from the one that is held by the mold. Depending on the plastic material forming the parison, the cut can be performed with electrically heated blades 12. Depending on the shape of the article to be formed, bars for welding the parison flowing out of the flow head may be provided to allow pre-blowing of the parison.

A pair of mold-holding plates 13 are provided to support the half molds. A carriage 14 holds the molds and governs transverse, opening, and closing movements of the mold-holding plates 13. A number of blow nozzles 15 blow compressed air into the parisons inside the molds so that the parisons adhere to the mold cavity for blowing of articles and cutting of scraps, called "sprues," of product necks to facilitate their later removal. (A sprue is the passage through which a molten material is introduced into a mold, and the term also refers to the excess material which solidifies in the sprue passage.) Article gripping plates 16 are synchronized with the transverse movement of the carriage 14 to facilitate picking up articles held by the blow nozzles 15 and moving them to a deflashing and calibration position.

A pneumatic scrap cutting system 17 removes upper and lower molded scrap via movement of the cutting blades 12. An article picker 18 picks up the articles from the scrap cutting system 17 and deposits them on a conveyor output belt 20 through vertical and longitudinal movement. The output conveyor belt 20 transports the finished articles outside the blow-molding machine 10. The output conveyor belt 20 can include an article suction system to increase stability of the articles during transportation. A scrap collection slide 19 collects and delivers scrap to a scrap collection belt 21. The scrap collection belt 21 transports scrap outside the blow-molding machine 10.

An example blow-molding machine 10 has been sold by Graham Packaging Company Italia SRL of Italy under the registered trademark TECHNE.

Figure 2:
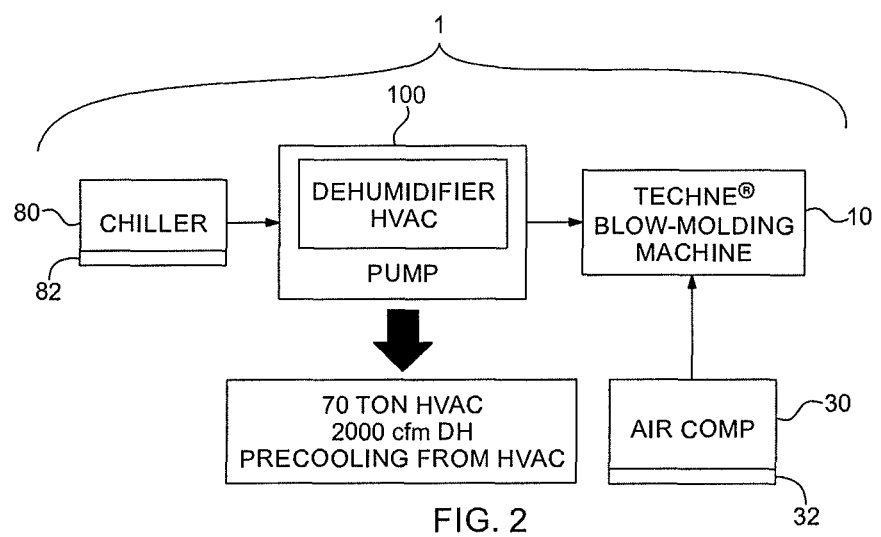
FIG. 2 is a schematic view of an exemplary system able to blow-mold articles according to an embodiment of the present invention, including the exemplary blow-molding machine illustrated in FIG. 1, a chiller, an air compressor, and a multi-functional utility skid having a pump, a dehumidifier, and a heating, ventilation, and air conditioning unit.

The multi-functional utility skid 100 is used in combination with the blow-molding machine 10. As described in detail below, and as illustrated schematically in FIG. 2, the utility skid 100 includes a pump 200, a dehumidifier (or DH) 300, and a heating, ventilation, and air conditioning (HVAC) unit 400. A commercially available air compressor 30 is provided, and located (typically on a skid 32) adjacent to the blow-molding machine 10, as it is for a conventional design. A chiller 80 is also located (typically on a skid 82) remotely from the blow-molding machine 10, as its heat load requires and as it is for a conventional design.

Preferably and contrary to conventional apparatus, however, a single (not more than one) chiller 80 is provided as part of the system 1. Conventional apparatus typically have a separate, dedicated chiller for each process component: the air handling unit, the dehumidifier, and the process water. A single, centralized chiller 80 provides all of the chilled water needs for the system 1. The chiller 80 provides a closed loop process where water circulates from the pump 200 to the chiller 80. The chiller 80 lowers the water temperature. Water then feeds to the process equipment to transfer process heat to the water, and returns to the pump 200.

Also contrary to the conventional apparatus, the pump 200, dehumidifier 300, and HVAC unit 400 are combined into a single, integral component located on a single multi-functional utility skid 100 adjacent to the blow-molding machine 10 in the system 1. Thus, the utilities needed by the blow-molding machine 10 are provided in three (as opposed to five) separate skids. And two of the skids (namely, the multi-functional utility skid 100 and the skid 32 supporting the air compressor 30) are located adjacent to the blow-molding machine 10; only the skid 82 which supports the chiller 80 is located remotely from the blow-molding machine 10.

B. Air Compressor

An air compressor is a device that converts power (typically provided by an electric motor) into potential energy stored in pressurized air (i.e., compressed air). By one of several methods, an air compressor forces more and more air into a storage tank, increasing the pressure. When tank pressure reaches its upper limit, the air compressor shuts off. The compressed air, then, is held in the tank until called into use. The energy contained in the compressed air can be used for a variety of applications, utilizing the kinetic energy of the air as it is released and the tank depressurizes. When tank pressure reaches its lower limit, the air compressor turns on again and re-pressurizes the tank.

Although there are compressors that use rotating impellers to generate air pressure, positive-displacement compressors are more common. In positive-displacement compressors, air pressure is increased by reducing the size of the space that contains the air. A typical positive-displacement compressor accomplishes this with a reciprocating piston (although rotary screw compressors and vane compressors are also common).

Figure 3:
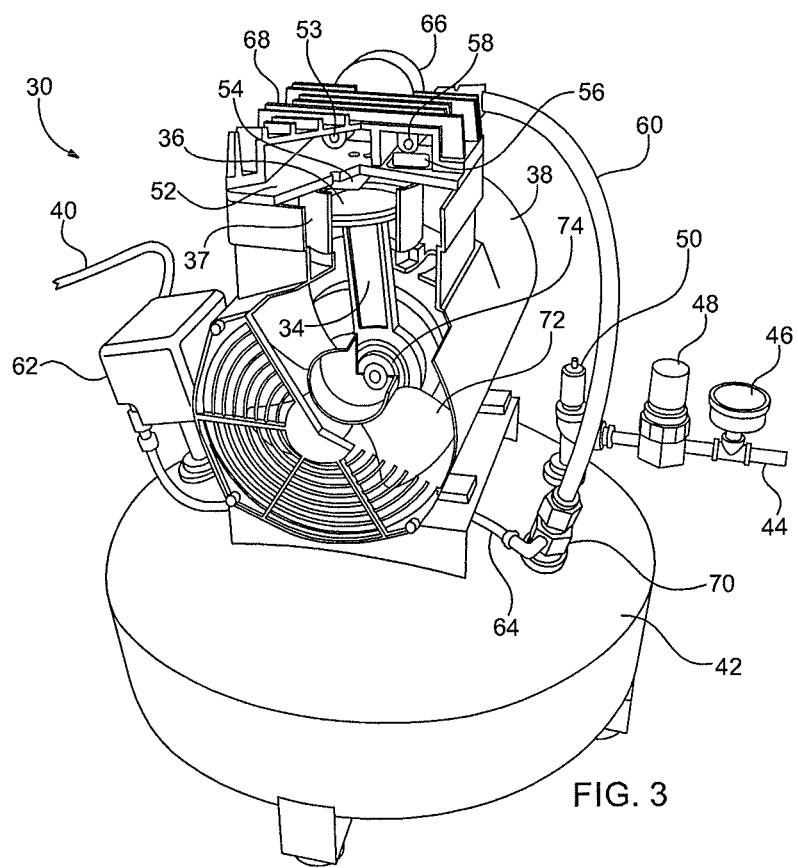
FIG. 3 illustrates an exemplary air compressor suitable for use in the system shown in FIG. 2.

The air compressor 30 used in connection with the blow-molding machine 10 supplies pressurized air to the blow-molding machine 10. The larger the articles to be made using the blow-molding machine 10, the higher the air pressure needed. The air compressor 30 must sustain a reliable supply of pressurized air even at extreme conditions (e.g., 55° C. and 85% humidity). A suitable air compressor 30 is illustrated in FIG. 3.

Like a small internal combustion engine, the air compressor 30 has a crankshaft, a connecting rod 34, a piston 36, a cylinder, and a valve plate 52. The piston 36 is located within a piston sleeve 37. The crankshaft is driven by an electric motor 38 connected to a source of electricity by a power line 40. A fan 72 rotates about a bearing 74. The air compressor 30 has an air storage tank 42 to hold a quantity of air within a preset pressure range. The compressed air in the tank 42 is provided to the blow-molding machine 10 through an air supply 44. Included on the air supply 44 are a gauge 46, a regulator 48, and a safety valve 50. The motor 38 cycles on and off to automatically maintain pressure in the tank 42.

The valve plate 52 is located at the top of the cylinder. The valve plate 52 holds an inlet valve 54 and a discharge valve 56. Both the inlet valve 54 and the discharge valve 56 are simply thin metal flaps—one mounted underneath and one mounted on top of the valve plate 52.

As the piston 36 moves down, a vacuum is created above it. This allows is outside air at atmospheric pressure to enter the inlet port 53, push open the inlet valve 54, and fill the area above the piston 36. The outside air enters the inlet port 53 after passing through an air filter 66 and a plurality of cooling fins 68. As the piston 36 moves up, the air above it compresses, holds the inlet valve 54 shut, and pushes the discharge valve 56 open. The air moves from the discharge valve 56, through a discharge port 58 and a discharge tube 60, and to the tank 42. With each stroke of the piston 36, more air enters the tank 42 and the pressure in the tank 42 rises.

The air compressor 30 uses a pressure switch 62 to stop the motor 38 when the tank pressure reaches a preset limit. Most of the time, however, the blow-molding machine 10 does not require that much pressure. Therefore, the air supply 44 includes the regulator 48, which can be set to match the pressure requirements of the blow-molding machine 10. A gauge before the regulator 48 monitors tank pressure and the gauge 46 after the regulator 48 monitors air supply pressure. In addition, the safety valve 50 on the tank 42 opens if the pressure switch 62 malfunctions. The pressure switch 62 may also incorporate an unloader valve that reduces tank pressure, through an unloader tube 64, when the air compressor 30 is turned off. The unloader tube 64 and the discharge tube 60 both connect to a check valve 70 located at the top of the tank 42.

A suitable air compressor 30 can be obtained from Ingersoll Rand plc of Dublin, Ireland. Compressors are often rated by Horsepower (HP), and a 75 HP air compressor is suitable. Although a conventional air compressor 30 is suitable for use in connection with the blow-molding machine 10, improved air compressors can also be used. An example of an improved air compressor is disclosed in U.S. Pat. No. 9,314,957 assigned to Krones AG of Germany.

C. Air Cooled Water Chiller

The air-cooled chiller 80 is used to supply chilled water to the blow-molding machine 10 for the purpose of cooling the molds. The air-cooled chiller 80 is a type of refrigeration device. It implements a process of evaporation and condensation within a closed system to chill water, and is more energy efficient than traditional Freon-powered refrigerators. It is a common misconception that air-cooled chillers do not use water. What the name "air-cooled" actually means is that the chiller 80 does not use water to absorb waste heat from the closed system defined by the chiller 80.

The air-cooled chiller 80 ensures a continuous flow of coolant to the cold side of a process water system at a desired "leaving water temperature" or LWT of about 10° C. The coolant is then pumped through the process, extracting heat out of molds as it flows back to the return side of the process water system. The coolant flow, now at an elevated "entering water temperature" or EWT (5 to 10° warmer than the LWT), then reenters the air-cooled chiller 80, which does three things: it captures the heat from the process coolant, it transfers the captured heat out to the environment, and it lowers the temperature of the coolant to the desired LWT, rendering it ready for recirculation.

Figure 4:
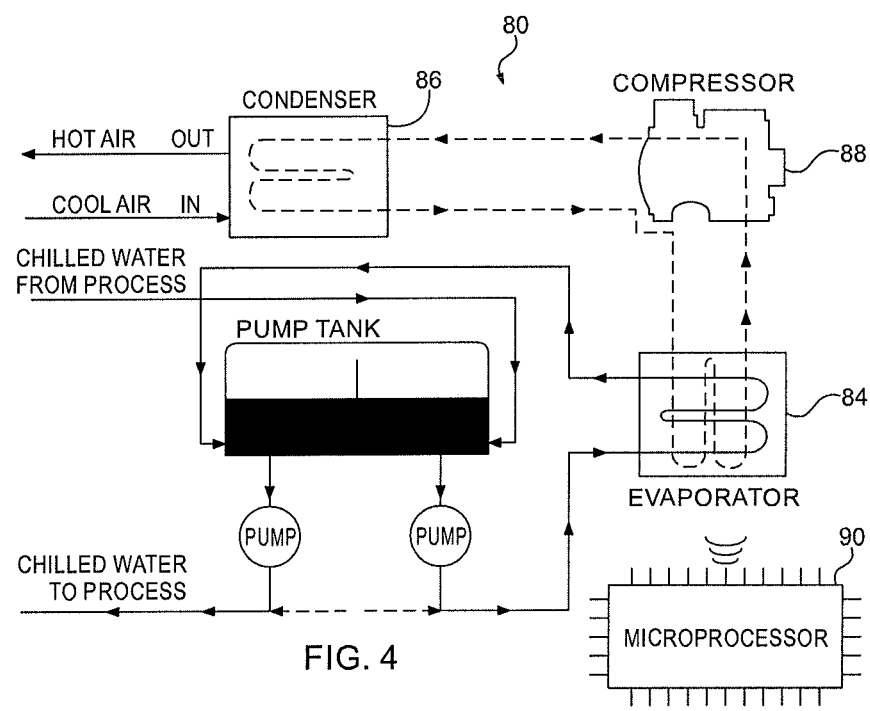
FIG. 4 illustrates the main components of an exemplary air-cooled chiller suitable for use in the system shown in FIG. 2.

The air-cooled chiller 80 has, as its main components, an evaporator 84, a condenser 86, and a compressor 88. These components are illustrated in FIG. 4. (The air-cooled chiller 80 also has an expansion valve.) The chilling process starts with the evaporator 84, which contains a liquid refrigerant (e.g., refrigerant type R410A) and has a shell of tubes surrounding a central chamber. The tubes surround the water that is meant to be cooled by the chiller 80. The central chamber of the evaporator 84 connects with the compressor 88. The compressor 88 connects with the condenser 86.

The refrigerant radiates out cold to the surrounding tubes that are filled with water. The water is chilled and pumped through a circuit, absorbing heat from the molds of the blow-mold machine 10 that the air-cooled chiller 80 is meant to cool. When the water has finally reached a high enough temperature, it radiates the heat back at the refrigerant in the evaporator 84, causing it to turn into vapor. The vapor passes through a pipe into the compressor 88, which compresses the vapor into a smaller space, putting it under high pressure and heat. This superheated vaporized refrigerant is then pumped through the condenser 86. The condenser 86 is a series of air-cooled vanes, similar to those found in the radiator of an automobile. The vapor gives off its heat into the surrounding air and then condenses back into a liquid. The liquid flows back into the evaporator 84 to repeat the chilling process.

Figure 5A:
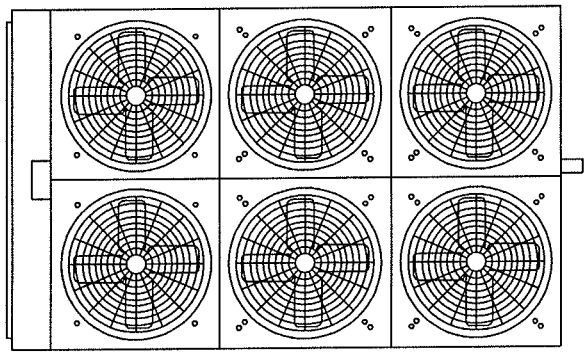
FIG. 5A is a top view of a York® model air-cooled chiller.
Figure 5B:
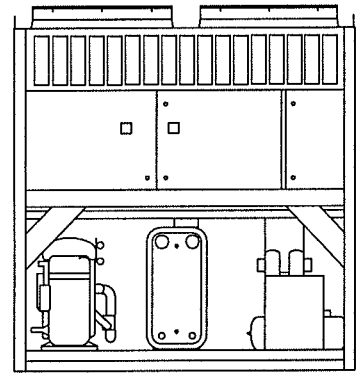
FIG. 5B is a first end view of the air-cooled chiller shown in FIG. 5A.
Figure 5C:
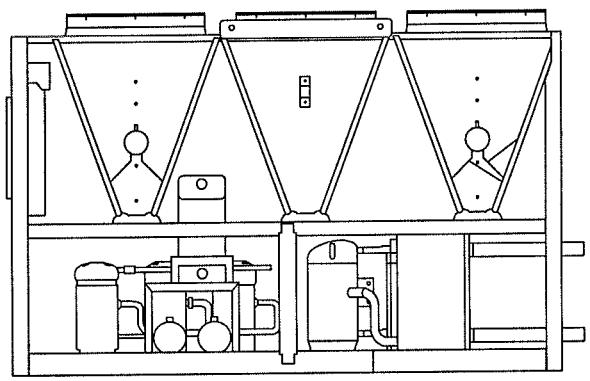
FIG. 5C is a side view of the air-cooled chiller shown in FIGS. 5A and 5B.
Figure 5D:
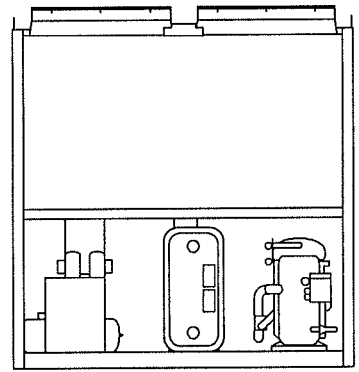
FIG. 5D is a second end view of the air-cooled chiller shown in FIGS. 5A, 5B, and 5C.
Figure 5E:
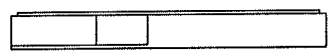
FIG. 5E is a bottom, detailed view of the control panel of the air-cooled chiller shown in FIGS. 5A, 5B, 5C, and 5D.

A suitable air-cooled chiller 80 can be obtained from Johnson Controls is Corporation, such as Model No. YLAA0101HE46 sold under the York registered trademark. This model is illustrated in FIGS. 5A, 5B, 5C, 5D, and 5E. FIG. 5A is a top view of the York® model air-cooled chiller 80, illustrating six fans. FIG. 5B is a first end view, FIG. 5C is a side view, and FIG. 5D is a second end view of the York® model air-cooled chiller 80. FIG. 5E is a bottom, detailed view of the control panel of the York® model air-cooled chiller 80. A table summarizing design parameters for the model is provided in FIG. 6. In summary, an exemplary embodiment of the chiller 80 is a 110 to 130 ton, air-cooled unit.

The air-cooled chiller 80 includes at least two refrigerant circuits above 50 tons (200 kW), scroll compressors 88, a direct expansion type evaporator 84, an air cooled condenser 86, refrigerant, a lubrication system, interconnecting wiring, and safety and operating controls including a capacity controller, a control center, and motor starting components. Each refrigerant circuit includes a discharge service ball-type isolation valve, high side pressure relief, liquid line shut off valve with charging port, low side pressure relief device, filter drier, solenoid valve, sight glass with moisture indicator, thermostatic expansion valves, and flexible, closed cell foam insulation suction line and suction pressure transducer. Discharge (ball type) isolation valves are installed for the refrigerant circuit.

The model includes a high-pressure relief valve. Discharge pressure transducers permit the unit to sense and display discharge pressure. Suction pressure transducers permit the unit to sense and display suction pressure.

The hermetic, scroll type compressors are compliant for axial and radial sealing. Refrigerant flows through the compressor 88 with a 100% suction cool motor. A large suction side free volume oil sump provides liquid handling capability. Compressor crankcase heaters provide extra liquid migration protection. An annular discharge check valve and reverse vent assembly provides low pressure drop, silent shutdown, and reverse rotation protection. The compressor 88 is charged with oil and includes an oil level sight glass. Vibration isolator mounts are provided. Brazed-type connections are provided for fully hermetic refrigerant circuits. Compressor motor overloads monitor compressor motor current and provide extra protection against compressor reverse rotation, phase loss, and phase imbalance.

The evaporator 84 is a brazed-plate stainless steel construction capable of refrigerant working pressure of 650 psig (3,103 kPa) and liquid side pressure of 150 psig (1,034 kPa). The evaporator 84 includes vent and drain fittings and thermostatically controlled heaters. Strainer and mechanical couplings are provided for field installation on the evaporator inlet. The model requires vent and drain accommodations in chilled water piping near the evaporator 84.

The condenser 86 includes condenser coils constructed of a single material to avoid galvanic corrosion due to dissimilar metals. The coils are designed for a working pressure of 650 psig. Low-sound fans are dynamically and statically balanced, direct drive, corrosion resistant glass fiber reinforced composite blades molded into a low noise, full airfoil cross-section, providing vertical air discharge and low sound. Each fan has an individual compartment to prevent crossflow during fan cycling. Guards are provided. Fan motors drive the fans.

Controls permit automatic start, stop, operating, and protection sequences across the range of scheduled conditions and transients. A microprocessor 90 is used to control the air-cooled chiller 80. Compressor, control, and fan motor power wiring is located in an enclosed panel or routed through a liquid-tight conduit. Additional accessories and options may be provided.

Regardless of what model is used, the air-cooled chiller 80 is located remotely from both the blow-molding machine 10 and the multi-functional utility skid 100, due to its heat load. The distance between the air-cooled chiller 80 and the multi-functional utility skid 100 should be minimized, however, to reduce the amount of connection between the air-cooled chiller 80 and the pump 200 located on the multi-functional utility skid 100. The air-cooled chiller 80 is placed on a level surface free of obstructions.

By "remote" is meant situated relatively far away in space and, in this context, sufficiently far away from both the blow-molding machine 10 and the multi-functional utility skid 100 that the heat load of the chiller 80 does not affect adversely the operation of the blow-molding machine 10 or the multi-functional utility skid 100. A more precise definition of "remote" depends, of course, on the particular application. For many applications, however, the recommended minimum clearance distances for the chiller 80 are: 6 feet (183 cm) between the side and structural wall; 6 feet (183 cm) between the rear and structural wall; and 4 feet (122 cm) between the control panel and structural wall. No obstructions are allowed on the top of the air-cooled chiller 80.

D. Multi-Functional Utility Skid

The multi-functional utility skid 100 may be an aluminum skid of "C" channel design, typically between 15 cm to 25 cm in height. A formed steel multi-functional utility skid 100 is also suitable. As mentioned above, the multi-functional utility skid 100 supports at least three components: the pump 200, the dehumidifier 300, and the HVAC unit 400. Each of those components is discussed individually below. Additional components may also be included as part of the multi-functional utility skid 100.

1. Cooled Water Pump

A suitable pump 200 is illustrated in FIGS. 7A, 7B, and 7C. FIG. 7A is an end view, FIG. 7B is a side view, and FIG. 7C is a sectional side view of the pump 200. The pump 200 is located on the multi-functional utility skid 100 and receives, through a connection between the pump 200 and the air-cooled chiller 80, the chilled water from the air-cooled chiller 80. Pipes, hoses, or a combination of pipes and hoses 210 comprise the connection and cover the short distance between the air cooled chiller 80 and the pump 200. The chilled water travels in the pipes and hoses 210 from the air cooled chiller 80 to the pump 200. The pump 200 discharges supply water both to the HVAC unit 400 and to the blow-molding machine 10.

The exemplary embodiment of the pump 200 illustrated in FIGS. 7A, 7B, and 7C is an end suction pump, one of the most common types of centrifugal pumps. The pump 200 is a single stage pump, which is one of the most cost-effective types of centrifugal pumps. The pump 200 has one impeller 202 and a volute-casing 204. The pump 200 is close coupled, meaning the impeller 202 attaches directly to a crankshaft 206 which drives the impeller 202, with no separate coupling between those two components. A mechanical seal 208 is provided, however, around the crankshaft 206. The components of the pump 200 are enclosed within a sealed housing 212, which may be made of plastic or standard iron.

The pump 200 works when the pumped chilled water increases velocity as the chilled water moves along the vanes of the impeller 202, then the water moves into the volute-casing 204, where a diffusion process converts the high velocity into high pressure. The pump 200 is driven by an electric motor (not shown). The chilled water enters the pump 200 through a suction port 214, which provides a point of entrance to the impeller 202. The water leaves the pump 200 at a discharge port 216. A suitable pump 200 is available from Process Systems, Inc. of Warren, Mich. The pump 200 is preferably capable of moving 350 gpm of chilled water at 100 psi.

2. Dehumidifier

The general concept behind the use of temporary dehumidification or climate control equipment is to create an environment that reduces the relative humidity in the space below 50%. This conditioning process should create a differential between the dew point temperature in the space and the temperature of the actual surface. If the surface temperature should reach the interior dew point temperature, moisture vapor from the air will condense on component surfaces. These surfaces will then be at risk for corrosion.

Dehumidification is the process in which moisture is removed from the air. There are primarily two methods of dehumidification: (a) removing moisture by passing wet air over a refrigerated coil; and (b) using desiccants to remove moisture by vapor pressure differential. Although the former refrigeration type of dehumidification might be used, the latter desiccant type of dehumidification is preferred because available in large capacities and, therefore, is the focus of the following discussion.

Figure 8:
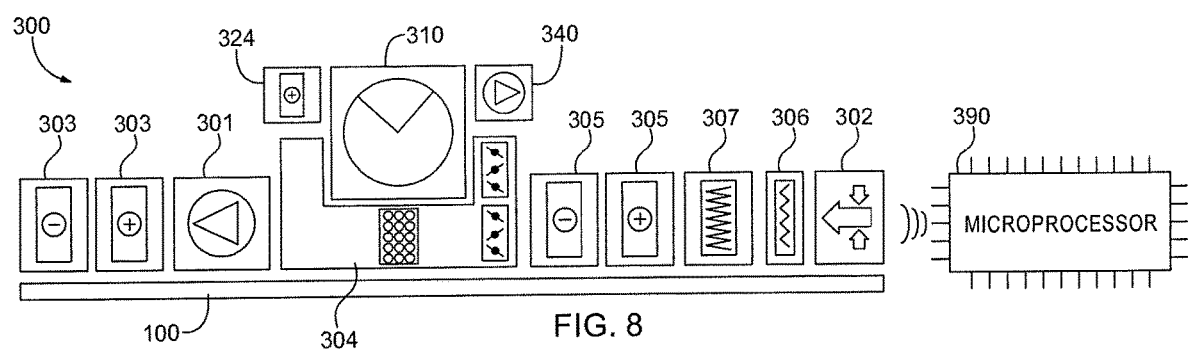
FIG. 8 is a schematic view of an exemplary dehumidifier suitable for use in the system shown in FIG. 2.

The components of a suitable dehumidifier 300 are illustrated schematically in FIG. 8. A process air blower plenum 301 moves process air out of the dehumidifier 300. The process air blower plenum 301 is insulated to avoid condensation when the process air temperature is below the dew point of surrounding air. The process air blower plenum 301 also provides in-line airflow to the mixing box. A post-heat/cool coil plenum 303 may be provided to further condition the process air.

A mixing plenum 302 allows incoming air to be mixed with up to four other incoming air streams. Manual dampers are provided to balance the airflows. The mixed air stream can then be further conditioned by downstream modules. For example, a pre-heat/cool coil plenum 305 may be provided to further condition the incoming air. The pre-heat/cool coil plenum 305 and the post-heat/cool coil plenum 303 house a maximum often rows of coils for direct expansion refrigeration, chilled water, hot water, steam, or combinations to provide pre- or post-cooling or heating. Alternatively, electric heating elements can also be housed in the pre-heat/cool coil plenum 305 and the post-heat/cool coil plenum 303.

A face and bypass plenum 304 provides complete bypass capabilities. The face and bypass plenum 304 has face and bypass dampers of low leakage design. These dampers are operated by proportioning actuators.

A disposable pre-filter 306 of about 30% efficiency is combined with a disposable, high-efficiency filter 307 of up to 95% efficiency. The pre-filter 306 and the filter 307 each have slide rails that provide easy access for maintenance. The pre-filter 306 and the filter 307 further condition the incoming air.

The various components of the dehumidifier 300 are supported on the multi-functional utility skid 100. The main component of the dehumidifier 300 is a self-regenerating desiccant rotor 310. Desiccants attract moisture from the air by creating an area of low vapor pressure at the surface of the desiccant. The pressure exerted by the water in the air is higher, so the water molecules move from the air to the desiccant and the air is dehumidified. In the desiccant wheel type dehumidifier, as the process air passes through a desiccant wheel 312, moisture is absorbed and trapped. As the wheel 312 rotates, it is dried by heated reactivation air after which it is ready to absorb more moisture. Desiccants used in this application are silica gel-based which are ideal for highly saturated air streams. They have very good moisture removal capacity over a broad range of humidity levels.

Figure 9:
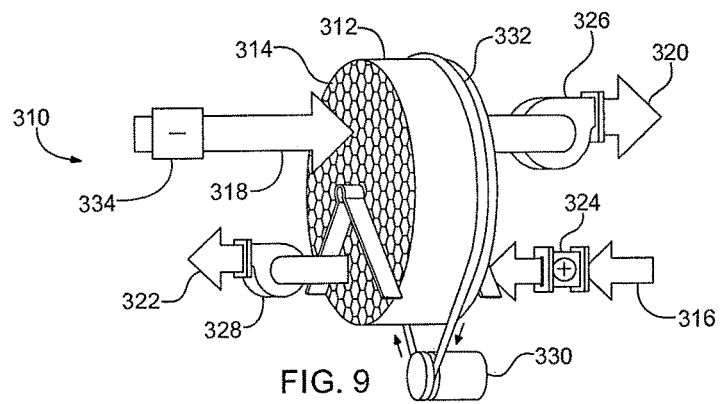
FIG. 9 illustrates a typical process diagram for the desiccant rotor of the dehumidifier shown in FIG. 8.

FIG. 9 illustrates a typical process diagram for the desiccant rotor 310 for the dehumidifier 300. The desiccant rotor 310 comprises the wheel 312 that encloses a circular honeycomb matrix 314 of desiccant material. The wheel 312 and matrix 314 provide a large surface area for the desiccant material. The wheel 312 is slowly rotated within the process and reactivation air streams of the dehumidifier 300. As the wheel 312 rotates, moisture is absorbed from the damp, incoming process air stream 318 in one half of the rotation and delivered to the reactivation (or regeneration) air stream 316 in the other half of the rotation. Thus, moisture from the process air stream 318 is transferred to the matrix 314 and then from the matrix 314 to the reactivation air stream 316 (which dries the desiccant matrix 314). The process air stream 318 exits externally from the desiccant rotor 310 as dry exit air 320, which is delivered to the blow-molding machine 10 by a pump 326. The reactivation air stream 316 is exhausted from the desiccant rotor 310 as wet exhaust air 322, which is exhausted externally from the dehumidifier 300 by a pump 328. As the wheel 312 continues to rotate, the adsorbent process is repeated.

Reactivation is typically completed through the use of a heating coil 324. The heating coil 324 may be electric with solid state proportioning control, steam with proportional air volume control, or gas (direct/indirect) with a modulating gas valve. Additional heating and cooling components, such as a cooler 334, may also be provided as part of the desiccant rotor 310.

The wheel 312 of the desiccant rotor 310 is rotated by a small, simple, drive system with few moving parts. As illustrated in FIG. 9, the drive system includes an electric motor 330 and a self-tensioning drive belt 332. The motor 330 may be inverter speed-controlled for improved control.

Contact air seals of the dehumidifier 300 separate the reactivation and process air streams 316 and 318, respectively. Process and reactivation fans may be provided (reactivation fan 340 is illustrated in FIG. 8). Such fans are centrifugal, direct drive fans with totally enclosed fan-cooled motors. Electrical controls assure continuous automatic operation of the dehumidifier 300 and include motor starters, overload protective devices, and a microprocessor 390 with indicating lights and fault circuits. The housing for dehumidifier 300 includes process and reactivation air flow insulation, is covered by a durable air-dry polyurethane paint, and comprises an all-welded aluminum cabinet. The housing ensures minimal, if any, air leakage.

A suitable dehumidifier 300 is available from Munters Corporation of Amesbury, Mass. Munters' HCD series of modular dehumidifiers 300 are preferred. The dehumidifier 300 reduces the dew point in the environment of the is blow-molding machine 10 to levels that avoid corrosion and other adverse effects.

3. HVAC Unit

The dehumidifier 300 controls the humidity of the environment in which the blow-molding machine 10 operates. It is also desirable, however, to control the air temperature of that environment. Such air temperature control is provided by the HVAC unit 400.

The HVAC unit 400 also pre-cools the air to be provided to the dehumidifier 300. Thus, the dehumidifier 300 receives pre-cooled air rather than ambient air, increasing the efficiency of the system 1. In addition, the need for a heat exchanger, typically present in conventional utility systems, is avoided.

Figure 10:
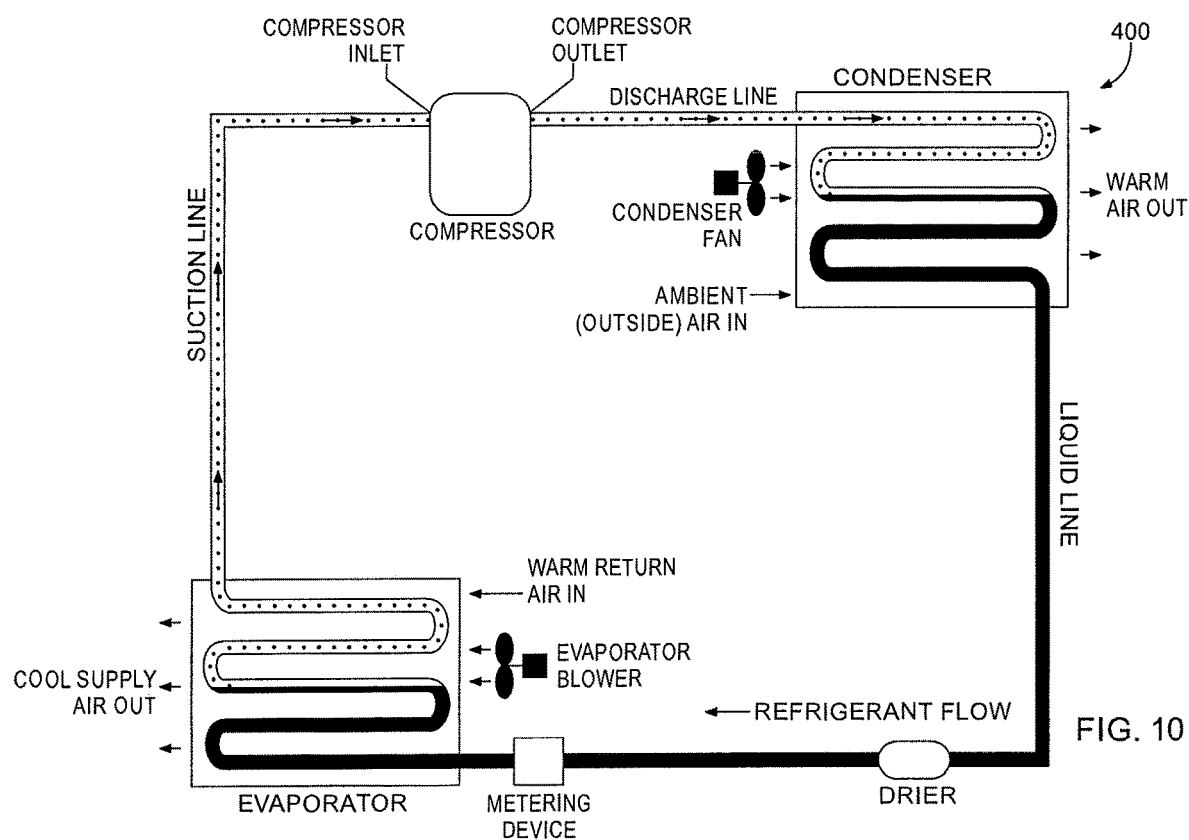
FIG. 10 illustrates the components and operation of an HVAC unit suitable for use in the system shown in FIG. 2.
Figure 11:
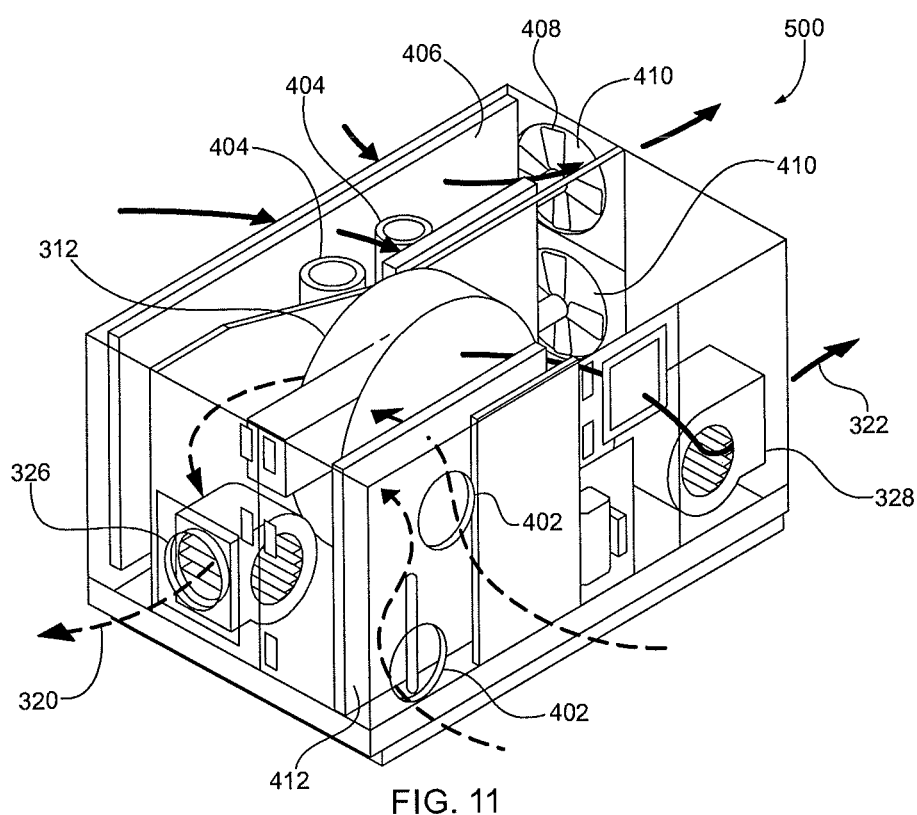
FIG. 11 is a schematic perspective view illustrating the components of the HVAC unit combined with the dehumidifier to form an integral unit.

FIG. 10 illustrates the components and operation of a suitable HVAC unit 400. The components of the HVAC unit 400 are integrated into the desiccant dehumidifier 300, as illustrated in FIG. 11, to form an integral unit 500. By "integral" is meant a single piece or a single unitary part that is complete by itself without additional pieces, i.e., the part is of one monolithic piece formed as a unit with another part. The integrated configuration is mounted on the multi-functional utility skid 100, providing a single source, factory-assembled unit. The HVAC unit 400 preferably has a 70 to 90 ton air handling capability.

The integral unit 500 includes all of the components of both the desiccant dehumidifier 300 and the HVAC unit 400. Specifically shown in FIG. 11 are the desiccant rotor wheel 312, the dry exit air 320, the pump 326, the wet exhaust air 322, and the pump 328 of the desiccant dehumidifier 300. Representative of the HVAC unit 400 are air return vents 402, compressors 404, condenser coils 406, a condenser fan 408, a condenser air outlet 410, and an evaporator coil 412.

The air return vents 402 mark the starting point of the ventilation cycle. Fans suck air in via the air return vents 402, draw the air through a filter, then pass the air to other components to either heat or cool the air. The compressors 404 convert refrigerant from a gas to liquid and send it into the condenser coils 406. Refrigerant runs through the condenser coils 406, cooling the air as it passes through. The condenser fan 408 moves the air through the condenser air outlet 410. The evaporator coil 412, also called the evaporator core, is the part of the system where the refrigerant absorbs heat. Thus, cold air comes from the evaporator coil 412.

The integral unit 500 incorporates several technologies in tandem to deliver a cool, dry air stream to the blow-molding machine 10 while conserving energy. In turn, that cool, dry air stream creates an optimal environment (both temperature and humidity) for the blow-molding machine 10. The desiccant dehumidifier 300 uses air from the HVAC unit 400 to enter the wheel 312 where the moisture is removed from the wheel 312 by sorption. The wheel 312 becomes moist. Another air stream is heated and passed through the wheel 312 to dry or regenerate the wheel 312. The process is necessary to ensure the high capacity of drying to occur. It is the regeneration process, however, that creates most of the energy consumption required by the dehumidifier 300.

The inclusion of the components of the HVAC unit 400 in the integral unit 500 permits use of the energy waste from the HVAC unit 400 to combat the problem of energy consumption by the dehumidifier 300. More specifically, the waste heat from the condenser coils 406 of the HVAC unit 400 is used to reactivate the dehumidifier 300. The waste heat significantly reduces the overall reactivation energy required to regenerate the wheel 312, thus saving significant amounts of energy and costs.

The pump 200 is also integrated with the HVAC unit 400 and the dehumidifier 300 of the integral unit 500 to form a single, integral multi-functional utility skid 100. The three components (pump 200, dehumidifier 300, and HVAC unit 400) are all supported on the utility skid 100. In an alternative embodiment, the pump 200 may be located inside the dehumidifier 300.

The multi-functional utility skid 100 reduces the number of connections required to deliver utilities to the blow-molding machine 10. More specifically, one power drop, for pipe or hose connections, and one duct connection are provided between the multi-functional utility skid 100 and the blow-molding machine 10. The multi-functional utility skid 100 also reduces costs by eliminating redundant components, and reduces installation time.

The multi-functional utility skid 100 is located proximate the blow-molding machine 10. By "proximate" is meant closely related in space and, in this context, adjacent. A more precise definition of "proximate" depends, of course, on the particular application. For many applications, however, the multi-functional utility skid 100 directly contacts (i.e., touches) the blow-molding machine 10.

E. Interaction of Components

Figure 12:
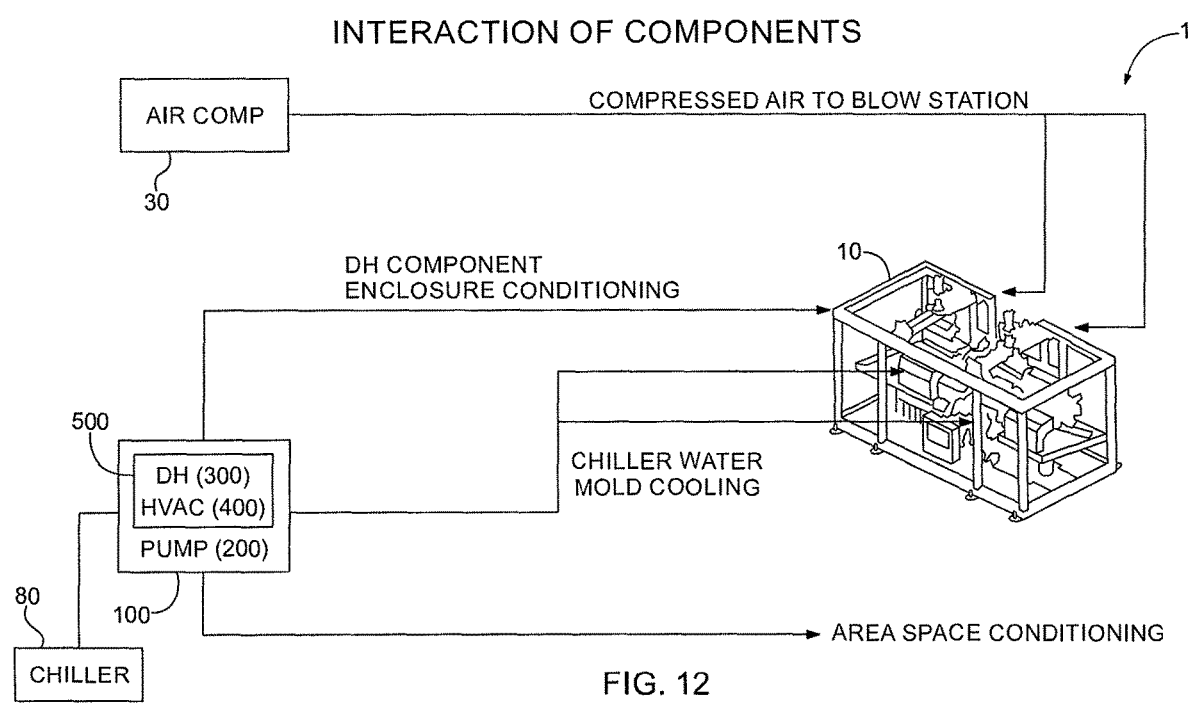
FIG. 12 is a schematic view illustrating the interaction among the components of the system shown in FIG. 2.

FIG. 12 illustrates, schematically, the interaction among the components of the system 1. The air compressor 30 is located as a separate unit, and delivers pressurized (compressed) air to the blow molds of the blow-molding machine 10. Due to its heat load, the air-cooled chiller 80 is also located remotely from both the blow-molding machine 10 and from the multi-functional utility skid 100. The air-cooled chiller 80 supplies chilled water to the pump 200 located on the multi-functional utility skid 100. In turn, the pump 200 relays the chilled water both to the blow molds of the blow-molding machine 10 for the purpose of cooling the molds and to the HVAC unit 400.

Also located on the multi-functional utility skid 100 are the dehumidifier 300 and the HVAC unit 400. The dehumidifier 300 controls the humidity of the environment in which the blow-molding machine 10 operates. The HVAC unit 400 controls the air temperature of that environment. The HVAC unit 400 also provides conditioned air to the dehumidifier 300. By combining the HVAC unit 400 with the dehumidifier 300, the multi-functional utility skid 100 eliminates an additional heat exchanger previous used in conventional apparatus. The elimination of that heat exchanger also reduces the piping previously required for that component.

Figure 13:
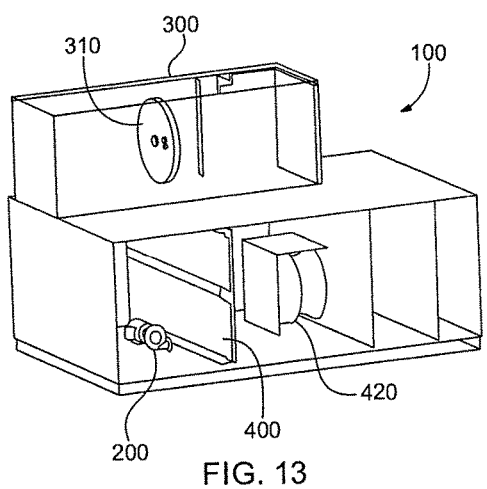
FIG. 13 illustrates an alternative embodiment of a multi-functional utility skid.

An alternative embodiment of the multi-functional utility skid 100 is illustrated in FIG. 13. As for earlier embodiments, the multi-functional utility skid 100 includes and combines the pump 200 with the HVAC unit 400 and the desiccant dehumidifier 300. As shown, the pump 200 is directly connected (i.e., without any intervening structure and immediately proximate) to the HVAC unit 400. The direct connection between the pump 200 and the HVAC unit 400 allows for reduction in installation piping and saves floor space. A single (i.e., not more than one) air handler blower 420 is provided as part of the multi-functional utility skid 100. The use of the single air handler blower 420 allows for fewer components in the operation of the multi-functional utility skid 100. The air handler blower 420 supplies both regeneration air and process air to the desiccant dehumidifier 300. The use of a single air handler blower 420 for both the HVAC unit 400 and the desiccant dehumidifier 300 eliminates two additional blowers previously used in conventional apparatus. An additional advantage is that the single air handler blower 420 uses a lower amount of power than the sum of the three conventional blowers.

Figure 14:
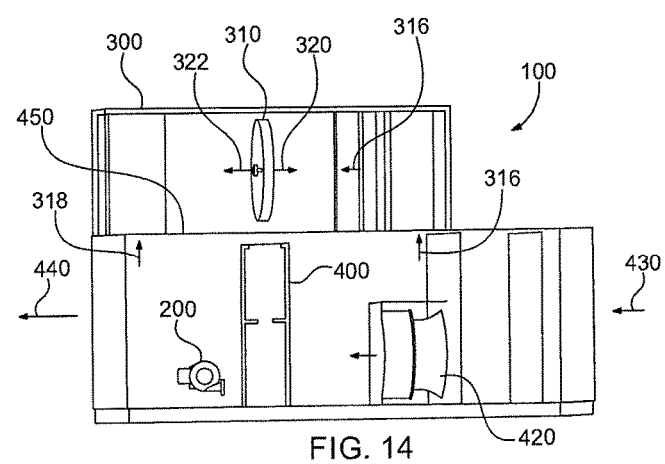
FIG. 14 highlights the air supply and flows of the multi-functional utility skid shown in FIG. 13.

FIG. 14 highlights the air supply and flows of the multi-functional utility skid 100 shown in FIG. 13. Air at ambient conditions is delivered to the multi-functional utility skid 100 through an air inlet 430. The volume of air is dictated by the needs of the dehumidifier 300 and by the environmental conditioning needed by the blow-molding machine 10. The air handler blower 420 provides the air to the HVAC unit 400. That air leaves the HVAC unit 400 as three, separate air flows, preferably separated by baffles in the HVAC unit 400 which balance the air flow through the three discharge points of the HVAC unit 400. First, conditioned air is provided to the environment of the blow-molding machine 10 through the conditioned air outlet 440. The second and third air flows are directed from the HVAC unit 400 to the desiccant dehumidifier 300 as follows.

An adjoining interface 450 exists between the HVAC unit 400 and the desiccant dehumidifier 300. The adjoining surface 450 has two, separate ports. The incoming process air stream 318 (the second or process air flow) passes from the HVAC unit 400 to the desiccant dehumidifier 300 through one of those ports. The incoming process air stream 318 is conditioned air and, after leaving the HVAC unit 400 and upon arrival at the desiccant dehumidifier 300, is typically at a temperature of about 80° F. with a dew point of about 60° F. The reactivation air stream 316 (the third or regenerative air flow) passes from the HVAC unit 400 to the desiccant dehumidifier 300 through the second of the two ports. The reactivation air stream 316 is unconditioned air at ambient conditions.

As discussed above with respect to FIG. 9, and illustrated in FIG. 14, the process air stream 318 exits externally from the desiccant rotor 310 of the desiccant dehumidifier 300 as dry exit air 320, which is delivered to the blow-molding machine 10. The dry exit air 320 is typically at a dew point of about 40° F. The reactivation air stream 316 is exhausted from the desiccant rotor 310 as wet exhaust air 322, which is exhausted externally from the dehumidifier 300.

Figure 15:
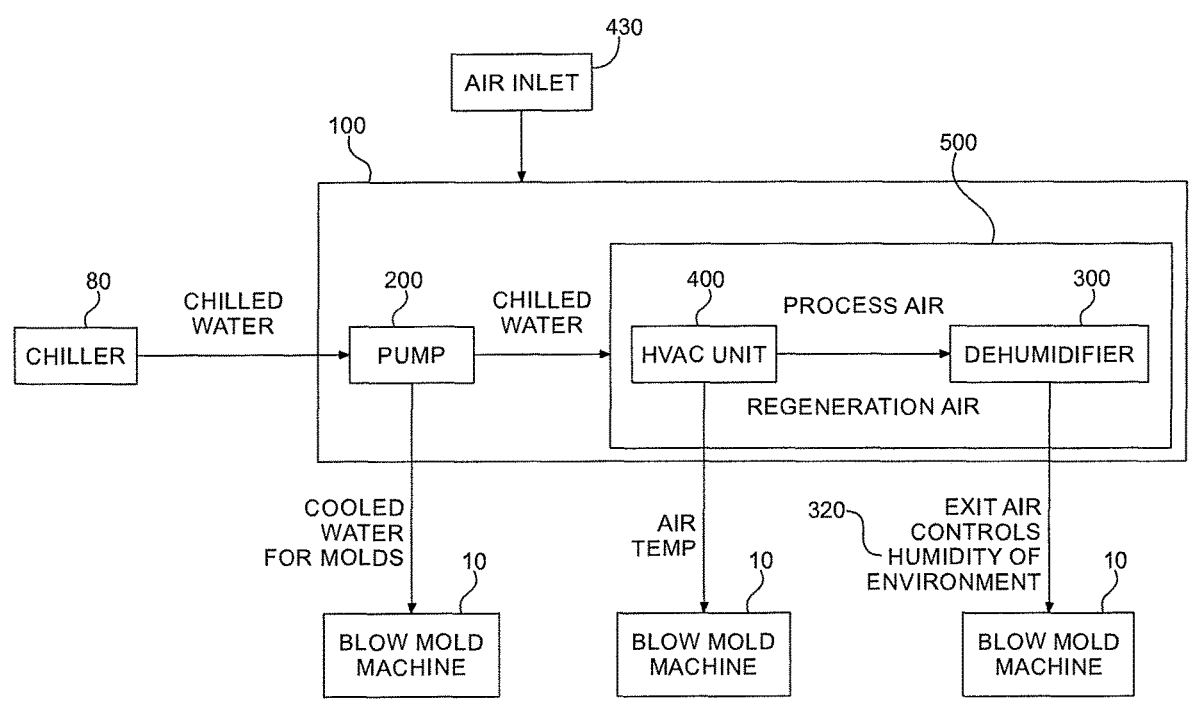
FIG. 15 is a schematic view illustrating the interaction among the components of the multi-functional utility skid shown in FIGS. 13 and 14.

FIG. 15 is a schematic view illustrating the interaction among the components of the multi-functional utility skid 100 shown in FIGS. 13 and 14. The system 1 including the multi-functional utility skid 100 reduces installation time, minimizes the cost of installation, increases equipment efficiency, lowers overall equipment cost, and decreases component maintenance.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

What is claimed is:

1. A system for blow-molding articles, the system comprising:
   a blow-molding machine having molds and a surrounding environment;
   an air compressor located proximate the blow-molding machine and configured to supply compressed air to the blow-molding machine;
   a chiller located remotely from the blow-molding machine and configured to provide chilled water;
   a connection having a first end engaging the chiller and a second end; and a multi-functional utility skid located proximate the blow-molding machine and including:
  (a) a pump configured to engage the second end of the connection and receive chilled water from the chiller, the pump further configured to provide chilled water to the blow-molding machine and to a separate supply of chilled water; and
  (b) an integral unit combining a dehumidifier with a heating, ventilation, and air conditioning unit, wherein the heating, ventilation, and air conditioning unit is configured to (i) engage the pump via a direct connection, (ii) receive the supply of chilled water from the pump, (iii) control the temperature of the environment surrounding the blow-molding machine via a first air stream, and (iv) supply a conditioned air stream and an unconditioned air stream to the dehumidifier without a heat exchanger, the dehumidifier and the heating, ventilation, and air conditioning unit being separated by an adjoining interface having two ports through which respectively pass the conditioned air stream and the unconditioned air stream from the heating, ventilation, and air conditioning unit to the dehumidifier.

2. The system according to claim 1, wherein the multi-functional utility skid further includes a single blower configured to receive ambient air through an air inlet and provide that air to the heating, ventilation, and air conditioning unit.

3. The system according to claim 2, wherein the heating, ventilation, and air conditioning unit is configured to divide the air received from the single blower into three, separate air flows, namely the first air stream, the conditioned air stream, and the unconditioned air stream that exit the heating, ventilation, and air conditioning unit through three separate discharge points.

4. The system according to claim 1, wherein the system comprises a single chiller.

5. The system according to claim 1, wherein the chiller has a side, a rear, and a control panel and both the blow-molding machine and the multi-functional utility skid are both located at least 183 cm from the side, 183 cm from the rear, and 122 cm from the control panel.

6. The system according to claim 1, wherein the system further comprises at least one microprocessor configured to control the chiller or to assure continuous automatic operation of the dehumidifier or both.

7. The system according to claim 1, wherein the multi-functional utility skid directly contacts the blow-molding machine.

8. The system according to claim 1, wherein the pump is a single stage centrifugal pump.

9. The system according to claim 1, wherein the pump is integrated with the heating, ventilation, and air conditioning unit and the dehumidifier as part of the integral unit.

10. The system according to claim 1, wherein the dehumidifier uses desiccants to remove moisture from the conditioned air stream supplied by the heating, ventilation, and air conditioning unit and deliver a dry conditioned air stream.

11. The system according to claim 1, wherein the heating, ventilation, and air conditioning unit produces waste heat and the waste heat is used to reactivate the dehumidifier.

12. A multi-functional utility skid for use with an air compressor, a chiller, and a connection having a first end engaging the chiller and a second end, the skid providing utilities to a blow-molding machine for blow-molding articles in an environment and being located proximate the blow-molding machine and comprising:
  (a) a pump configured to engage the second end of the connection and receive chilled water from the chiller, the pump further configured to provide chilled water to the blow-molding machine and to a separate supply of chilled water; and
  (b) an integral unit combining a dehumidifier with a heating, ventilation, and air conditioning unit, wherein the heating, ventilation, and air conditioning unit is configured to (i) engage the pump via a direct connection, (ii) receive the supply of chilled water from the pump, (iii) control the temperature of the environment surrounding the blow-molding machine via a first air stream, and (iv) supply a conditioned air stream and an unconditioned air stream to the dehumidifier without a heat exchanger, the dehumidifier and the heating, ventilation, and air conditioning unit being separated by an adjoining interface having two ports through which respectively pass the conditioned air stream and the unconditioned air stream from the heating, ventilation, and air conditioning unit to the dehumidifier.

13. The multi-functional utility skid according to claim 12, further comprising a single blower configured to receive ambient air through an air inlet and provide that air to the heating, ventilation, and air conditioning unit.

14. The multi-functional utility skid according to claim 13, wherein the heating, ventilation, and air conditioning unit is configured to divide the air received from the single blower into three, separate air flows, namely the first air stream, the conditioned air stream, and the unconditioned air stream that exit the heating, ventilation, and air conditioning unit through three separate discharge points.

15. The multi-functional utility skid according to claim 12, further comprising at least one microprocessor configured to assure continuous automatic operation of the dehumidifier.

16. The multi-functional utility skid according to claim 12, wherein the pump is a single stage centrifugal pump.

17. The multi-functional utility skid according to claim 12, wherein the pump is integrated with the heating, ventilation, and air conditioning unit and the dehumidifier as part of the integral unit.

18. The multi-functional utility skid according to claim 12, wherein the dehumidifier uses desiccants to remove moisture from the conditioned air stream supplied by the heating, ventilation, and air conditioning unit and deliver a dry conditioned air stream.

19. The multi-functional utility skid according to claim 12, wherein the heating, ventilation, and air conditioning unit produces waste heat and the waste heat is used to reactivate the dehumidifier.

20. A multi-functional utility skid for use with an air compressor, a chiller, and a connection having a first end engaging the chiller and a second end, the skid providing utilities to a blow-molding machine for blow-molding articles in an environment and being located proximate the blow-molding machine and comprising, as an integral unit:
  (a) a pump configured to engage the second end of the connection and receive chilled water from the chiller, the pump further configured to provide chilled water to the blow-molding machine and to a separate supply of chilled water;
  (b) a dehumidifier using desiccants to remove moisture from a conditioned air stream and deliver a dry conditioned air stream;

(c) a heating, ventilation, and air conditioning unit configured to (i) engage the pump via a direct connection, (ii) receive the supply of chilled water from the pump, (iii) control the temperature of the environment surrounding the blow-molding machine via a first air stream, (iv) supply the conditioned air stream and an unconditioned air stream to the dehumidifier without a heat exchanger, and (v) produce waste heat used to reactivate the dehumidifier, the dehumidifier and the heating, ventilation, and air conditioning unit being separated by an adjoining interface having two ports through which respectively pass the conditioned air stream and the unconditioned air stream from the heating, ventilation, and air conditioning unit to the dehumidifier; and (d) a single blower configured to receive ambient air through an air inlet and provide that air to the heating, ventilation, and air conditioning unit, wherein the heating, ventilation, and air conditioning unit is further configured to divide the air received from the single blower into three, separate air flows, namely the first air stream, the conditioned air stream, and the unconditioned air stream that exit the heating, ventilation, and air conditioning unit through three separate discharge points.

* * * * *